(12) United States Patent
Wang et al.

(10) Patent No.: US 11,976,984 B1
(45) Date of Patent: May 7, 2024

(54) METHOD AND SYSTEM FOR PREDICTING JUNCTION TEMPERATURE OF POWER SEMICONDUCTOR MODULE IN FULL LIFE CYCLE, AND TERMINAL

(71) Applicant: Huazhong University of Science and Technology, Wuhan (CN)

(72) Inventors: Zhiqiang Wang, Wuhan (CN); Yayong Yang, Wuhan (CN); Guoqing Xin, Wuhan (CN); Xiaojie Shi, Wuhan (CN); Yong Kang, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 18/182,339

(22) Filed: Mar. 12, 2023

(30) Foreign Application Priority Data

Dec. 19, 2022 (CN) .......................... 202211632622.7

(51) Int. Cl.
*G01K 7/22* (2006.01)
*G01K 15/00* (2006.01)

(52) U.S. Cl.
CPC ............. *G01K 7/22* (2013.01); *G01K 15/005* (2013.01)

(58) Field of Classification Search
CPC .......... G01K 7/22; G01K 15/005; G06N 3/08; G06N 3/044; G06N 3/045; G06N 3/048; G10L 15/16; G10L 2015/088; G06F 40/279; G06F 17/153; G06F 17/16; G06F 5/01; G06Q 50/06; G06Q 10/06393
USPC ...................... 374/170, 178, 185, 183, 5, 57
See application file for complete search history.

(56) References Cited

U.S. PATENT DOCUMENTS 11,543,305 B2 * 1/2023 He ........................ G06F 17/15

FOREIGN PATENT DOCUMENTS

| CN | 101025618 A | * | 8/2007 | |
|---|---|---|---|---|
| CN | 103681552 A | | 3/2014 | |
| CN | 105784179 A | * | 7/2016 | |
| CN | 106443400 A | * | 2/2017 | ......... G01R 31/2601 |
| CN | 106960085 A | * | 7/2017 | |
| CN | 107219016 A | * | 9/2017 | ............... G01K 7/22 |

(Continued)

OTHER PUBLICATIONS

18182339_2023-10-16_CN_107219016_A_H.pdf,Sep. 2017.*

(Continued)

*Primary Examiner* — Gail Kaplan Verbitsky
(74) *Attorney, Agent, or Firm* — Nitin Kaushik

(57) ABSTRACT

The present disclosure belongs to the technical field of power electronic converters, and discloses a method and a system for predicting a junction temperature of a power semiconductor module in the full life cycle and a terminal. The method includes the steps: arranging an NTC thermistor network to monitor the temperature of each area inside the power module when the power module works; obtaining data for training the neural network by utilizing finite element simulation or experiments, and building a neural network model among the temperature of the NTC resistor network, a water flow rate, an aging factor and the junction temperature of the chip under working conditions. The present disclosure improves the junction temperature prediction accuracy of areas with relatively large errors comprehensively and realizes the high-precision junction temperature prediction under all working conditions.

5 Claims, 6 Drawing Sheets

(56) References Cited

FOREIGN PATENT DOCUMENTS

| CN | 109727932 | A | | 5/2019 | |
|---|---|---|---|---|---|
| CN | 113361586 | A | * | 9/2021 | |
| CN | 113954638 | A | * | 1/2022 | ............... G01K 7/22 |
| CN | 217544596 | U | | 10/2022 | |
| CN | 115342938 | A | * | 11/2022 | |
| CN | 115828699 | A | * | 3/2023 | |
| JP | 2018096970 | A | * | 6/2018 | ............... G01K 7/01 |
| KR | 20210133375 | A | * | 11/2008 | |

OTHER PUBLICATIONS

18182339_2023-10-16_CN_113361586_A_I.pdf,Sep. 2021.*
18182339_2023-10-16_CN_113954638_A_I.pdf,Jan. 2022.*
18182339_2023-10-16_CN_115828699_A_I.pdf,Mar. 2023.*
18182339_2023-10-16_CN_101025618_A_H.pdf,Aug. 2007.*
18182339_2023-10-16_CN_106960085_A_H.pdf,Jul. 2017.*
18182339_2023-10-16_CN_115342938_A_H.pdf,Nov. 2022.*
18182339_2023-10-17_KR_20210133375_A_H.pdf,Nov. 2008.*
18182339_2023-10-17_JP_2018096970_A_H.pdf,Jun. 2018.*
18182339_2024-03-05_CN_106960085_A_H.pdf,Jul. 18, 2017*
18182339_2024-03-05_CN_106443400_A_H.pdf,Feb. 22, 2017*

* cited by examiner

METHOD AND SYSTEM FOR PREDICTING JUNCTION TEMPERATURE OF POWER SEMICONDUCTOR MODULE IN FULL LIFE CYCLE, AND TERMINAL

CROSS-REFERENCE TO RELATED APPLICATIONS

The application claims priority to Chinese patent application No. 2022116326227, filed on Dec. 19, 2022, the entire contents of which are incorporated herein by reference.

TECHNICAL FIELD

The present disclosure belongs to the technical field of power electronic converters, and particularly relates to a method and a system for predicting a junction temperature of a power semiconductor module in the full life cycle, and a terminal.

BACKGROUND

At present, with the rapid development of new energy vehicles, rail transit, renewable energy power generation, and other applications, power electronic converters as the core unit for power transmission have become increasingly important. The reliability of a power module as a basic switching unit of a power electronic converter has a decisive influence on the reliability of the converter. The junction temperature of the power module is one of key parameters affecting the reliability of the power electronic converter. It is of great significance to detect the junction temperature information of the power module and monitor the working state of the power module in real time during the operation of the converter to ensure the safe and reliable operation of the converter.

Commonly used detection methods for the junction temperature of the power module mainly include the following four categories: an optical method, a thermal network model method, a thermosensitive electric parameter method, and a physical contact method. The principle for detecting the junction temperature by the optical method is the correlation between the thermal radiation characteristics of an object and the temperature. An infrared thermal imager utilizes the principle to measure the temperature of the surface of a chip. The optical method has the advantages that the two-dimensional temperature distribution of the surfaces of multiple chips inside the power module can be obtained, but for the optical method, it is necessary to open a shell of the power module to remove a potting adhesive and apply black paint on the surfaces of the chips. In addition, the sampling rate of the existing commercial infrared thermal imager is limited, which cannot meet the need for real-time measurement of junction temperature, and therefore, the optical method is difficult to be practically applied in industrial application scenarios. The thermal network model method extracts thermal resistance network models of the power module and a radiator thereof through experiments or finite element simulation, makes analysis according to the working conditions of the converter, and calculates the power loss of a semiconductor chip under the operating condition. Finally, the junction temperature of the chip inside the power module is obtained according to the measured temperature of a substrate of the power module and the thermal resistance network model for the converter. The thermal network model method needs an accurate loss online identification method and a transient thermal impedance network parameter identification algorithm to accurately predict the junction temperature of the chip in real time. In practical applications, it is difficult to measure an electric current flowing through each chip in parallel chips, which leads to difficulties in online identification of the loss of each chip in the parallel chips. During the long-term operation of the converter, the power module will undergo aging, which will change the thermal resistance network, resulting in the error of junction temperature prediction. The thermosensitive electric parameter method uses the relationship between the electrical parameters of the chip in the power module and the temperature to indirectly obtain the junction temperature and has the advantages of fast response and easy on-line detection. When the junction temperature of the chip is obtained by a method based on thermosensitive electrical parameters such as threshold voltage, turn-off delay time, and on-resistance, the electric current flowing through the chip needs to be obtained, measuring equipment is required to have high accuracy, required measuring circuits are complex, and most methods have relatively low sensitivity. It is difficult to apply the thermosensitive electric parameter method to the measurement of the junction temperature of a multi-chip parallel, power module, which further limits the application scope of the thermosensitive electric parameter method. The physical contact method generally uses temperature sensors (thermistors, thermocouples) to obtain the temperature information of parts contacting with the temperature sensors inside the module. The temperature reflected by the temperature sensor is only the temperature near an area in which the temperature sensor is located. As the temperature sensor cannot directly contact with the chip, the temperature measured by the temperature sensor is different from the actual junction temperature of the chip.

Through the above analysis, the prior art has the following problems and defects:

(1) For the existing detection method for the junction temperature of the power module based on the optical method, it is necessary to open the shell of the power module shell to remove the potting adhesive and apply black paint on the surface of the chip. The sampling rate of the existing commercial infrared thermal imager is limited, which cannot meet the needs of real-time measurement of junction temperature, and therefore, the detection method is difficult to be practically applied in industrial application scenarios.

(2) For the existing thermal network model method, in practical applications, it is difficult to measure the electric current flowing through each chip in parallel chips, which leads to difficulties in online identification of the loss of each chip in the parallel chips.

(3) When the junction temperature of the chip is obtained by the method based on thermosensitive electrical parameters such as threshold voltage, turn-off delay time, and on-resistance, the electric current flowing through the chip needs to be obtained, measuring equipment is required to have high accuracy, required measuring circuits are complex, and most methods have relatively low sensitivity. It is difficult to apply the thermosensitive electric parameter method to the measurement of the junction temperature of the multi-chip parallel power module.

(4) The temperature reflected by the temperature sensor adopted in, the physical contact method is only the temperature near an area in which the temperature sensor is located. As the temperature sensor cannot directly contact with the chip, the temperature measured by the temperature sensor is different from the actual junction temperature of the chip.

SUMMARY

Aiming at problems existing in the detection of the junction temperature of a power module in the prior art, the present disclosure provides a method and a system for predicting a junction temperature of a power semiconductor module in the full life cycle, and a terminal, and in particular relates to a method and a system for predicting the junction temperature of a data-driven power semiconductor module in the full life cycle based on a negative temperature coefficient (NTC) thermistor network, a medium, a device, and a terminal.

The present disclosure is realized as follows: a method for predicting the junction temperature of a power semiconductor module in the full fife cycle is provided and includes: arranging an NTC thermistor network to monitor the temperature of each area inside the power module when the power module works; obtaining data for training the neural network by utilizing finite element simulation or experiments, and building a neural network model among the temperature of the NTC resistor network, a water flow rate, an aging factor, and the junction temperature of the chip under working conditions of a high/low switching frequency, a high/low junction temperature, a high/low water flow rate and an aging degree; dividing a data set according to the proportion of 70% of training set, 15% of testing set and 15% of verification set, and training the neural network model according to input and output data; transplanting the trained neural network model to a controller of power electronic equipment, and calibrating the neural network model online; predicting the junction temperature of the chip of the aged power module by using the updated neural network model, evaluating the SOH (State Of Health) of the module online, and performing early warning of, the potential failure in the later life cycle.

Further, the method for predicting the junction temperature, of a power semiconductor module in the full life cycle includes the following steps:

step one. arranging the NTC thermistor network to monitor the temperature of each area inside, the power module when the power module works;

step two. building the neural network model among the parameters of the NTC thermistor network under various working conditions;

step three. training the neural network model according to the obtained input and output data; and step four. deploying the neural network model to realize the on-line detection of the junction temperature of the chip.

Further, the arranging the NTC thermistor network in step one includes that the number of NTC thermistors arranged is equivalent to the number of chips inside the power module; the NTC thermistors are placed at positions that facilitate processing and manufacturing; a high temperature area of the power module is located near MOST (Metal-Oxide-Semiconductor Field Effect Transistors) or IGBTs (Insulated Gate Bipolar Translator), a middle temperature area is located near diodes, and a loss temperature area is located far from the chips in the power module; the number of the NTC thermistors arranged in the high temperature area is close to that of the MOSFETs IGBTs, the number of the NTC thermistors in the middle temperature area is half that of the diode chips, and the number of the NTC thermistors in the low temperature area is 2-4; the number and location of the chips placed in each area are optimized according to simulation results; and according to the layout scheme of temperature sensors, the temperature of each area inside the power module is monitored when the power module works.

Further, the building the neural network model in step two includes: when the finite element simulation or experiments are utilized to obtain data for training the neural network, various working conditions are simulated, multiple sets of data are collected, and the neural network model among the temperature of the NTC resistor network, the water flow rate, the aging factor and the junction temperature of the chip is built under working conditions of the high/low switching frequency, the high/lows junction temperature, the high/low water flow rate and the aging degree. In the simulation or experiments, multiple sets of steady-state junction temperature data of each chip and temperature data of each thermistor under various working conditions are obtained in total by greatly changing the heating power P of the chip, the coolant flow ii of the power module and the aging factor F describing the aging degree. In the simulation, the aging degree is changed by reducing the thermal conductivity of each layer of packaging materials of the power module. In the experiments, the aging degree is changed by accelerating aging through power cycle or temperature cycle experiments.

In temperature data, the temperature of part of NTC thermistors which are closely and thermally coupled with the chips and the water flow rate h are selected as the inputs of the neural network, the temperature of the remaining NTC thermistors in the high, middle and low temperature areas is selected as the calibration output of the neural network, and the junction temperature of all the chips is selected as the target output of the neural network; the aging factor F reflecting the aging degree is taken as the input of the neural network, so that the neural network model is updated adaptively according to the aging condition of the power module; when the power module is aged, the neural network is updated by changing so the input F value, and the F value is determined by the temperature of the NTC resistors as the calibration output of the neural network; when the power module is not aged, the F value is 0; when the power module is aged, the F value is determined by the following formula:

$$F_{Ri}=k_i(T_{Ri(actual)}-T_{Ri(predict)})/T_{Ri(actual)}-T_{amb});$$

where $k_i$ represents a proportional coefficient, $T_{Ri(actual)}$ represents the measured temperature of the NTC resistor labeled i, $T_{Ri(predict)}$ represents the output temperature of the corresponding NTC resistor predicated by the neutral network when the F value of the NTC resistor labeled i is 0 and the power module is not aged, and $T_{amb}$ represents an environment temperature.

A power module temperature measuring platform is built, by combining applications and actual working conditions, and temperature measurement is performed by using an optical fiber or a thermal imager, so that multiple sets of training data under actual working conditions are obtained; and h weighing the prediction accuracy of the junction temperature of the chip and the number of the NTC thermistors, the number of inputs and outputs of the neural network is adjusted according to application requirements.

Further, the training the neural network model in step three includes that when the neural network model is trained according to the obtained input and output data, the number of layers of the selected neural network and the number of neurons in a hidden layer are obtained by manual debugging or by optimization through a genetic algorithm in optimization algorithms, and the neural network model with the best fitting effect is selected; the training of the neural network is completed in computer software MATLAB or Python; and before training, the chub) set is divided according to the proportion of 70% of training set, 15% of testing set and 15% of verification set.

Further, the deploying the neural network model in step four includes that the trained neural network model is transplanted to a controller such as a FPGA (Field Programmable Gate Array) of power electronic equipment to realize online detection of the junction temperature of the chip; when the power module works, the controller predicts the output of the neural network as the junction temperature of multiple chips and calibrates the temperature of the NTC thermistor by collecting the water flow rate h, the temperature T of the thermistor as the input of the neural network and the aging factor F reflecting the aging condition in real time; by comparing the predicted temperature value and the measured value of the neutral network for calibrating the NTC thermistor, whether the module has an accelerated aging phenomenon is checked online, wherein is set to 0; if the corresponding F value calculated according to the difference between the predicted temperature value and measured value of the neural network changes greatly, the input F value is updated; the updating threshold of the aging factor F is set; when the difference between the latest calculated F value and the F value during calibration exceeds the set threshold, the online updating process of the neural network is started; and the threshold setting is related to the proportional coefficient k, and the appropriate k value is selected.

If it is difficult to obtain data related to the aging degree during obtaining data, a network weight is updated during updating the neural network, and meanwhile the aging factor as the input is set to 0; when the difference between the measured temperature of the NTC thermistor as the calibration output and the predicted temperature of the neural network model exceeds 3° C. for three consecutive times, the online weight updating process of the neural network is started, wherein the training data comes from historical cooling condition data of the power module, temperature measurement data of the NTC thermistor and junction temperature prediction data stored by the controller before the updating starts; according to the new training data, the neural network is retrained in the FPGA, and the weight value w of the neural network is updated, thereby realizing the online calibration of the neural network model; and the updated neural network is used for predicting the junction temperature of the chip in the aging power module, evaluating the SOH state of the module online, and warning the potential failure in the later life cycle.

Another objective of the present disclosure is to provide a system for predicting the junction temperature of aa power semiconductor module in the full life cycle by applying the method for predicting the junction temperature of a power semiconductor module in the full life cycle. The system for predicting the junction temperature of the power semiconductor module in the full life cycle includes:
  an NTC thermistor network arrangement module, configured to arrange an NTC thermistor network to monitor the temperature of each area inside the power module when the power module works;
  a neutral network model building module, configured to build a neural network model among the temperature of the NTC thermistor network, a water flow rate, an aging factor, and the junction temperature of the chip under various working conditions;
  a neutral network model training module, configured to divide a training set, a so testing set and a verification set in proportion, and train the neural network model according to the obtained input and output data; and
  a neutral network model deployment module, configured to deploy the neural network model, detect the junction temperature of the chip online, evaluate the SOH state of the module, and warn the potential failure in the later life cycle.

Another objective of the present disclosure is to provide a computer device that includes a memory and a processor, wherein the memory stores a computer program, and when the computer program is executed by the processor, the processor executes the steps of the method for predicting the junction temperature of the power semiconductor module in the full life cycle.

Another objective of the present disclosure is to provide a computer-readable storage medium that stores a computer program, wherein when the computer program is executed by the processor, the processor executes the steps of the method for predicting the junction temperature of a power semiconductor module in the full life cycle.

Another objective of the present disclosure is to provide an information data processing terminal, which is configured to realize the system for predicting the junction temperature of the power semiconductor module.

In combination with the above technical scheme and the technical problems solved, the technical scheme to be protected by the present disclosure has the following advantages and positive effects:

Firstly, in view of the technical problems existing in the above-mentioned prior art and the difficulty of solving the problems, how to solve the technical problem through the technical scheme of the present disclosure, and some creative technical effects being brought after the problems are solved are deeply analyzed in detail by closely combining the technical scheme protected by the present disclosure with results, data and the like in the research and development process. The specific description is as follows:

The present disclosure provides a data-driven junction temperature prediction method based on a negative temperature coefficient (NTC) thermistor network. The method for predicting the junction temperature of the power semiconductor module in the full life cycle has the following characteristics:

(1) The method accurately predicts the real-time junction temperature of each chip in the power module by taking the temperature of the NTC thermistor network, water flow data, and an aging factor as inputs through the high-precision neural network model so between inputs and outputs; the prediction process does not involve the electrothermal parameters of the chip itself; and the prediction accuracy is not affected by chip parameter discreteness, chip temperature difference, chip layout and the like.

(2) According to the method, the high-precision neural network model among the temperature of the NTC thermistor network, the water flow rate, the aging factor, and the junction temperature of the chip is obtained by training after obtaining multiple sets of high-quality data with rich characteristics in areas with different working conditions (a high/low switching frequency, a high/low junction temperature, a high/low water flow rate, and an aging degree), the junction temperature prediction accuracy of areas with relatively large errors is comprehensively improved, and the high-precision junction temperature prediction wider all working conditions is realized.

(3) The method accurately predicts the junction temperature of the chip in the aged module and warns the potential failure in the later life cycle by monitoring and calibrating the error between the temperature of the NTC thermistor and the predicted temperature of the neural network model in real time, identifying the accelerated aging phenomenon of the power module online, evaluating the SOH state of the module, and starting the online updating process of the neural network model.

Secondly, regarding the technical scheme as a whole or from the point of view of product, the technical effects and advantages of the technical scheme to be protected by the present disclosure are specifically described as follows:

The method for predicting the junction temperature of the power semiconductor module in the full life cycle based on data driving provided by the present disclosure predicts the real-time junction temperature (output) of a plurality of chips by querying the high-precision neural network (input/output relationship model) describing the relationship among the temperature of the NTC thermistor network, the water flow rate, the aging factor of the power module and the junction temperature of the chip according to the real-time temperature (input) measured by the built-in NTC thermistor network of the power module.

The simulation and experiment results show that the root mean square error of the neural network subjected to 1000 iterations of training is close to zero, which indicates that the training effect of the neural network is excellent. At the same time, the regression coefficient R is 0.99998, which indicates that there is a significant linear regression relationship between the output of the neural network and the target. The root mean square error and the regression coefficient result show that the trained neural network model can accurately reflect the relationship among the temperature of the NTC thermistor network, the water flow rate, the aging degree and the junction temperature of the SiC chip, and the high-precision junction temperature prediction in the full life cycle under all working conditions is realized.

BRIEF DESCRIPTION OF DRAWINGS

In order to more clearly illustrate the technical solutions of the embodiments of the present disclosure, the drawings to be used in the embodiments of the present disclosure will be briefly introduced below. It is apparent that the drawings described below are only some embodiments of the present disclosure. Those skilled in the art can also obtain other drawings based on these drawings without paying any creative work.

DETAILED DESCRIPTION OF THE EMBODIMENTS

In order to make the objectives, technical solutions and advantages of the present disclosure more comprehensible, the present disclosure will be further described in detail with reference to the following embodiments. It should be understood that the described specific embodiments are merely used to describe the present disclosure rather than to limit the present disclosure.

In view of the problems in the prior art, the present disclosure provides a method and a system for predicting the junction temperature of a power semiconductor module in the full life cycle and a terminal. The present disclosure is described in detail with reference to the accompanying drawings.

In order to make those skill in the art fully understand how the present disclosure is realized, this part is an explanatory example for explaining the technical scheme of the claim.

Explanation of terms: the power semiconductor module is a module composed of various power electronic devices which are arranged, combined, and packaged together according to a certain function; and the junction temperature refers to the highest temperature on an actual semiconductor chip in electronic equipment.

Figure 1:
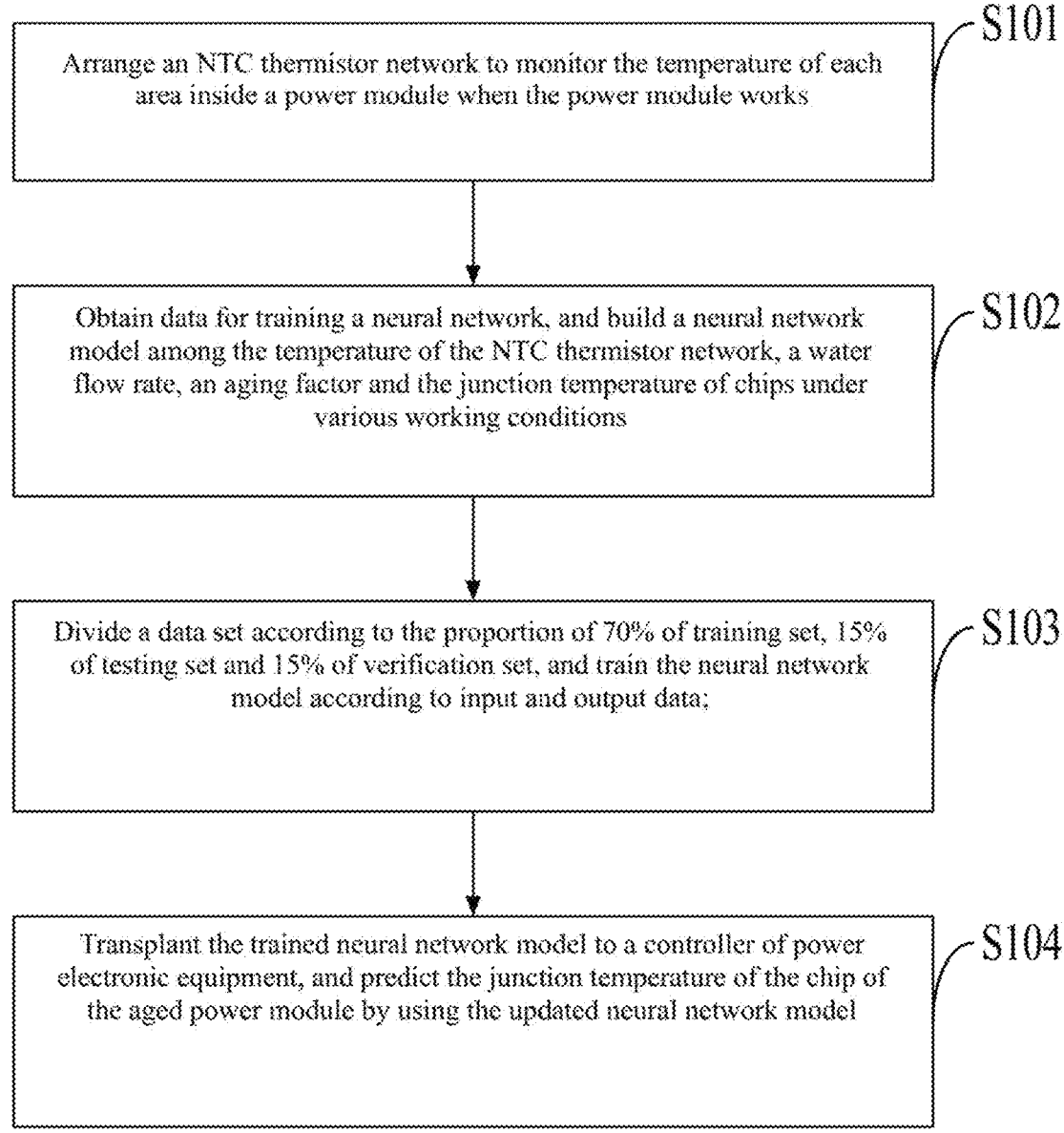
FIG. 1 shows a flow diagram of a method for predicting a junction temperature of a power semiconductor module in the full life cycle provided by an embodiment of the present disclosure.

As shown in FIG. 1, a method for predicting the junction temperature of a power semiconductor module in, the full life cycle provided by the embodiment of the present disclosure includes the following steps:

S101. arranging an NTC (Negative Temperature Coefficient) thermistor network to monitor the temperature of each area inside the power module when the power module works;

S102. obtaining data for training a neural network, and building a neural network model among the temperature of the NTC thermistor network, a water flow rate, an aging factor, and the junction temperature of chips under various working conditions;

S103. dividing a data set according to the proportion of 70% of training set, 15% of testing set, and 15% of verification set, and training the neural network model according to input and output data; and S104. transplanting the trained neural network model to a controller of power electronic equipment, and predicting the junction temperature of the chip of the aged power module by using the updated neural network model.

The method for predicting the junction temperature provided h the embodiment of the present embodiment predicts the real-time junction temperature (output) of a plurality of chips by querying the high-precision neural network (input/output relationship model) describing the relationship of the temperature of the NTC thermistor network, the water flow rate, the aging factor of the power module and the junction temperature of the chip according to the real-time temperature (input) measured by a built-in NTC thermistor network of the power module. The method is briefly described from the aspects of the arrangement of the NTC thermistor network, the building of the neural network model, the training of the neural network model, the deployment of the neural network model, and the like.

1. Arrangement of NTC Thermistor Network

The arrangement of the NTC thermistor network is a crucial step to realizing the present technology. The number and location of the NTC thermistors arranged in the power module affect the unction temperature prediction accuracy of the present method. The number of the NTC thermistors arranged should be equal to the number of chips m the power module. The arrangement of the thermistor network should not only consider the temperature monitoring function of high, middle, and low areas in the power module, but also needs to consider the influence of positions thereof on a power loop, so as to avoid affecting the current path of the power loop as much as possible. In addition, considering the processing technology of the power module, the NTC resistor should be placed as far as possible in a position that facilities processing and manufacturing. The high temperature area of the power module is generally located near MOSFETs (Metal-Oxide-Semiconductor Field Effect Transistor) or IGBTs (Insulated Gate Bipolar Translator), the middle temperature area is located near diodes, and the low temperature area is located far from chips in the power module. The number of the NTC thermistors arranged in the high temperature area is as close as possible to the number of the MOSFETS or the IGBTs, the number of the NTC thermistors in the middle temperature area is about half that of the diode chips, and the number of the NTC thermistors in the low temperature area is 2-4. The specific number and locations of chips arranged in each area can be optimized according to the simulation results. According to the above-mentioned arrangement scheme of the temperature sensor, when the power module works, the temperature of each area inside the power module can be monitored in real time and comprehensively, which lays a foundation for accurately predicting the junction temperature of multiple chips.

2. Building of Neural Network Model

In order to obtain the neural network model among the temperature of the NTC thermistor network, the water flow rate, the aging factor, and the junction temperature of the chip under various working conditions (a high/low switching frequency, a high/low junction temperature, a high/low water flow rate, and an aging degree), it is necessary to simulate various working conditions and collect multiple sets of high-quality data with rich characteristics when finite element simulation or experiments are used for obtaining data for neural network training. In the simulation or experiments, multiple sets of steady-state junction temperature data of each chip and temperature data of each thermistor under various working conditions can be obtained in total by greatly changing the heating power P of the chip, the coolant flow h of the power module, and the aging factor F describing the aging degree. It is worth noting that in the simulation, the aging degree can be changed by reducing the thermal conductivity of each layer of packaging materials of the power module, and in the experiments, the aging degree can be changed by accelerated aging through the power cycle or temperature cycle experiments. In these temperature data, the temperature of part of NTC thermistors which are closely and thermally coupled with the chips and the water flow rate h are selected as the input of the neural network, the temperature of the remaining NTC thermistors in the high, middle and low temperature areas is selected as the calibration output of the neural network, and the junction temperature of all the chips is selected as the target output of the neural network; t. In addition, the aging factor F reflecting the aging degree is taken as the input, of the neural network, so that the neural network model can be updated adaptively according to the aging condition of the power module; when the power module is aged, the neural network can be updated by changing the input F value, and does not need to be retrained. The F value is determined by the temperature of the NTC resistors as the calibration output of the neural network. When the power module is not aged, the F value is 0. When the power module is aged, the F value is determined by the following formula:

$$F_{Ri} = k_i (T_{Ri(actual)} - T_{Ri(predict)}) / T_{Ri(actual)} - T_{amb});$$

where $k_i$ represents a proportional coefficient, $T_{Ri(actual)}$ represents the measured temperature of the NTC resistor labeled i, $T_{Ri(predict)}$ represents the output temperature of the corresponding NTC resistor predicated by the neutral network when the F value of the NTC resistor labeled i is 0 and the power module is not aged, and $T_{amb}$ represents an environment temperature.

In order to ensure the accuracy of training data, a power module temperature measuring platform can be built, by combining specific applications and actual working conditions, and the temperature, is accurately measured by using an optical fiber or a thermal imager, so that multiple sets of training data under actual working conditions are obtained. In addition, by weighing the prediction accuracy of the junction temperature of the chip and the number of the NTC thermistors, the number of inputs and outputs of the neural network can be adjusted according to specific application requirements.

3. Training of Neutral Network Model

When the neural network model is trained according to the obtained input and output data, the number of layers of the selected neural network and the number of neurons in a hidden layer can be obtained by manual debugging or by optimization through an optimization algorithm, for example, a genetic algorithm, and the neural network model with the best fitting effect is selected. To improve the efficiency, the training of the neural network can be completed in corresponding computer software (MATLAB or Python). Before training, a reasonable division of the training set, the testing set, and the verification set is needed. The principle of division is 70% of training set, 15% of testing set, and 15% of verification set. When the scale of data is relatively small, the proportion of the training set can be appropriately increased.

4. Deployment of Neural Network Model

In order to realize the on-line detection of the junction temperature of the chip, the trained neural network model needs to be transplanted to a controller such as an FPGA (Field Programmable Gate Army) of power electronic equipment. When the power module works, the controller can predict the output of the neural network, that is, the junction temperature of multiple chips, and calibrates the temperature of the NTC thermistor by collecting the water flow h, the temperature T of the thermistor as the input of the neural network and the aging factor F reflecting the aging condition in real time. By comparing the predicted temperature value (F is set to 0) and the measured value of the neutral network for calibrating the NTC thermistor, whether the module has an accelerated aging phenomenon is checked online. If the corresponding F value calculated according to the difference between the predicted temperature value and the measured value of the neural network changes greatly, it shows that the neural network is not accurate enough at this time due to the aging of the module, and the neural network needs to be updated (the input F value is updated). In order to efficiently realize the online updating of the neural network model, the updating threshold of the aging factor can be set. When the difference between the latest calculated F value and the F value during the last calibration exceeds the set threshold, the online updating process of the neural network can be started. The threshold setting is related to the proportional coefficient k, while the k value affects the updating sensitivity of the aging degree, so it is necessary to select a suitable value of K. It is worth noting that the updating process does not involve the updating of the neural network structure and the weight thereof, and only the aging factor F as an input is updated. When the neural network is updated, it is only necessary to input the new F value calculated at this moment. The above updating method is based on the data reflecting the aging degree. If it is difficult to obtain the data related to the aging degree during obtaining data, a network weight needs to be updated during updating the neural network, and at the same time, the aging factor as the input is set to 0. Similarly, the updating threshold can be set to update the neural network model efficiently. For example, when the difference between the measured temperature of the NTC thermistor as the calibration output and the predicted temperature of the neural network model exceeds 3° C. for three consecutive times, the online weight updating process of the neural network can be started. The training data required in this scenario comes from historical cooling condition data of the power module, temperature measurement data of the NTC thermistor, and junction temperature prediction data stored by the controller before the updating starts. According to these new training data, the neural network can be retrained in the FPGA, and the weight value w of the neural network is updated, so that the online calibration of the neural network model is realized. The updated neural network can accurately predict the junction temperature of the chip in the aging power module, evaluate the SOH state of the module online, and warn the potential failure in the later life cycle.

A system for predicting the junction temperature of a power semiconductor module provided by an embodiment of the present disclosure includes:
    an NTC thermistor network arrangement module, configured to arrange an NTC thermistor network to monitor the temperature of each area inside the power module when the power module works;
    a neutral network model building module, configured to build a neural network model among the temperature of the NTC thermistor network, a water flow rate, an aging factor, and the junction temperature of the chip under various working conditions;
    a neutral network model training module, configured to divide a training set, a testing set, and a verification set in proportion, and train the neural network model according to the obtained input and output data; and
    a neutral network model deployment module, configured to deploy the neural network model, detect the junction temperature of the chip online, evaluate, the SOH state of the module, and warn the potential failure in the later life cycle.

Evidence of relevant effects of the embodiment. The embodiment of the present disclosure has achieved some positive effects in the process of research and development or use, and has great advantages compared with the prior art. The following contents are described in combination with data, charts, and the like of the test process.

Figure 2:
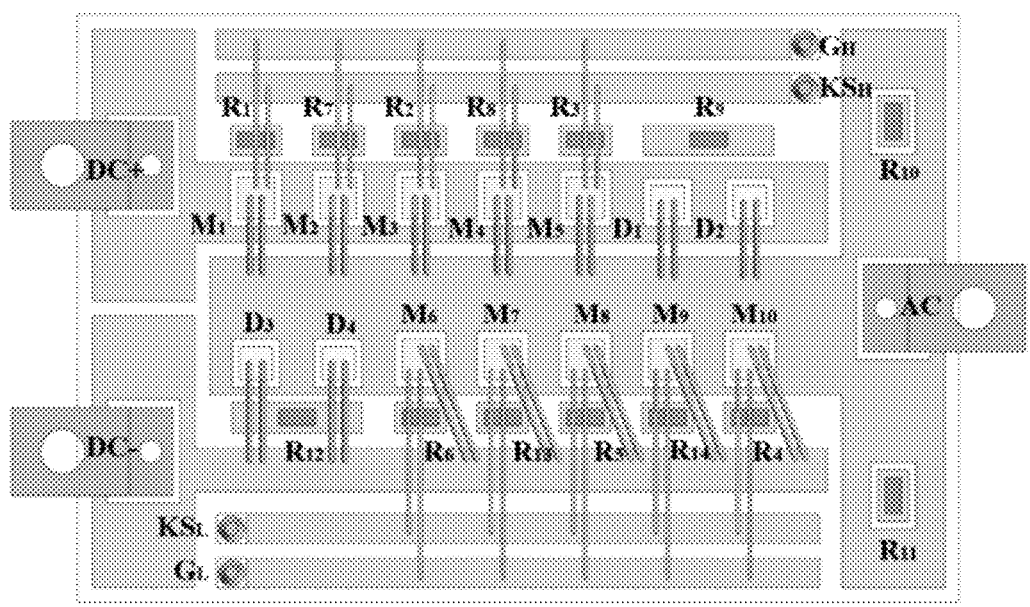
FIG. 2 shows a schematic diagram of the packaging layout of a multi-chip parallel SiC power module provided by an embodiment of the present disclosure.

Taking a half-bridge SiC power module shown in FIG. 2 as an example, the method of the present disclosure is briefly described.

In FIG. 2, each switching position of the SiC power module is formed by five SiC MOSFETs (upper tubes $M_1$-$M_5$ and lower tubes $M_6$-$M_{10}$) and two SiC Schottky diodes (upper tubes $D_1$-$D_2$ and lower tubes $D_3$-$D_4$) which are connected in parallel. Twelve NTC thermistors are symmetrically arranged in the vicinities of the SiC MOSFET and the diode chip, serve as temperature sensors, and are used for measuring the temperature around the SiC MOSFETs and the diode chips in real time, wherein NTC thermistors ($R_1$, $R_7$, $R_2$, $R_8$, $R_3$, $R_4$, $R_{14}$, $R_5$, $R_{13}$, $R_6$) near SiC MOSFETs chips are used for monitoring the temperature of the "high temperature" area inside the module, and NTC thermistors ($R_9$, $R_{12}$) near the SiC diode chips are used for monitoring the temperature of the "middle temperature" area inside the module. In addition, two NTC thermistors ($R_{10}$, $R_{11}$) are arranged far away from a heat source chip, and are used for monitoring the temperature of the "low temperature" area in the power module.

Figure 3:
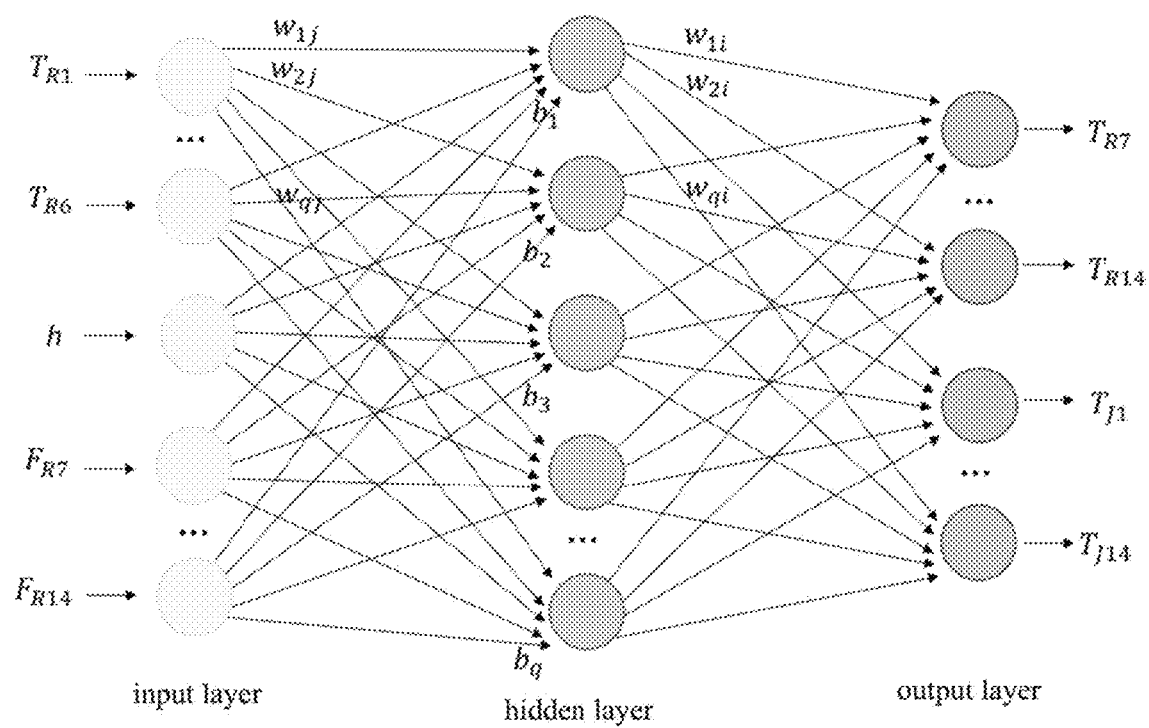
FIG. 3 is a structural schematic diagram of a neural network for predicting the junction temperature of an SiC chip provided by an embodiment of the present disclosure.

After the arrangement of the temperature sensors of the power module is completed, high-quality training data with rich characteristics are obtained by COMSOL finite element thermal simulation. In the simulation, 5000 sets of steady-state junction temperature data ($F_{J1}$-$F_{J14}$) of fourteen chips and temperature data ($T_{R1}$-$T_{R14}$) of fourteen thermistors under various working conditions were obtained in total by greatly changing the heating power P of the chip and the coolant flow h of the power module and increasing the thermal resistance of the materials of each layer of the power module (reducing the thermal conductivity of the materials of each layer). In these temperature data, the temperature ($T_{R1}$-$T_{R6}$) of six NTC thermistors closely and thermally coupled with the chips, the water flow rate h, and the aging factors ($F_{R7}$-$F_{R14}$) are selected as the inputs of the neural network, the temperature ($T_{R7}$-$T_{R14}$) of eight NTC thermistors in high, middle, and low temperature areas are selected as the calibration outputs of the neural network, and the junction temperature ($T_{J1}$-$T_{J14}$) of fourteen SiC chips is used as the target output of the neural network. The structural schematic diagram of the neural network provided by the present disclosure is shown in FIG. 3.

Figure 4:
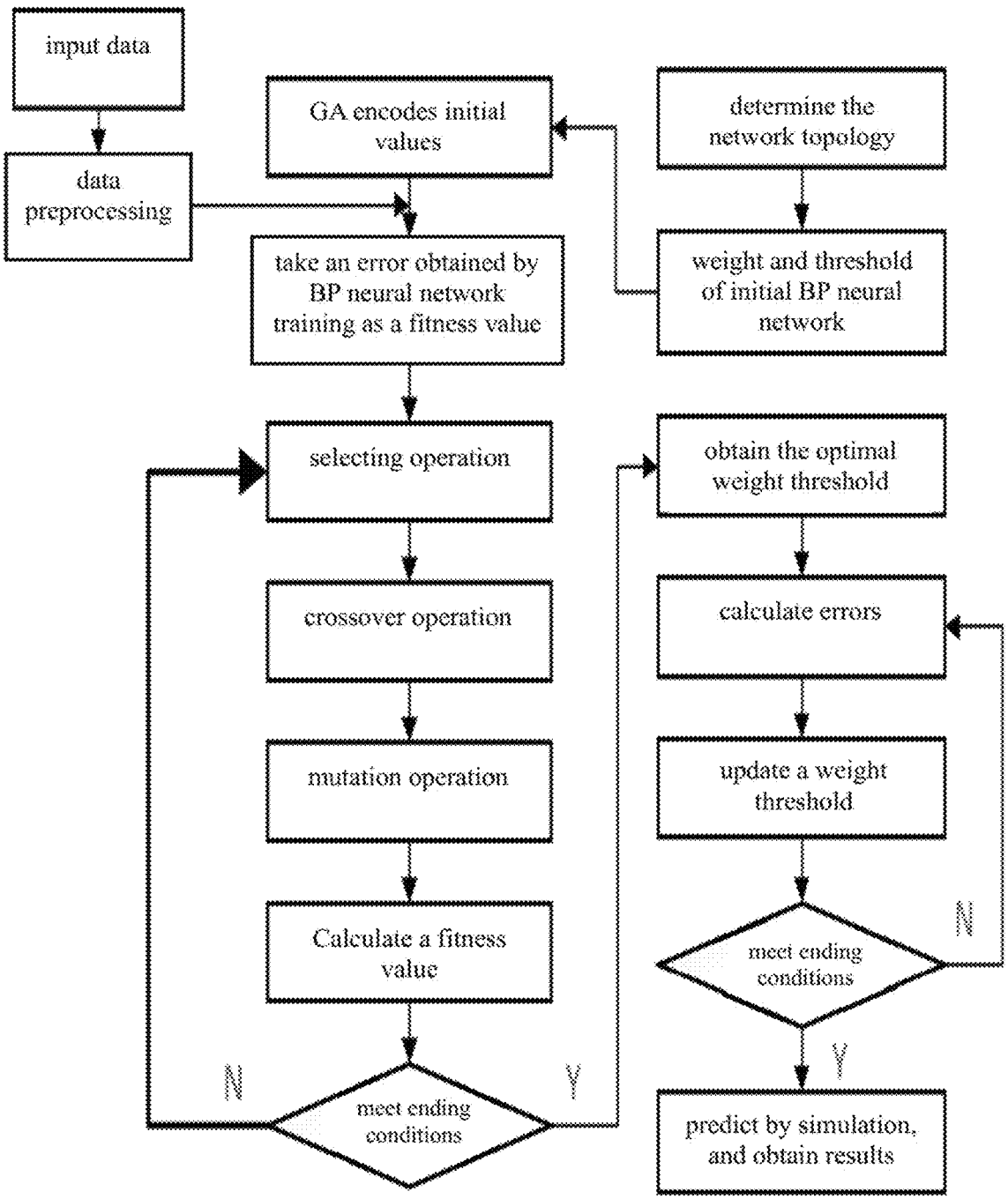
FIG. 4 shows a flow chart of a BP neural network optimized by GA provided by an embodiment of the present disclosure.
Figure 5A:
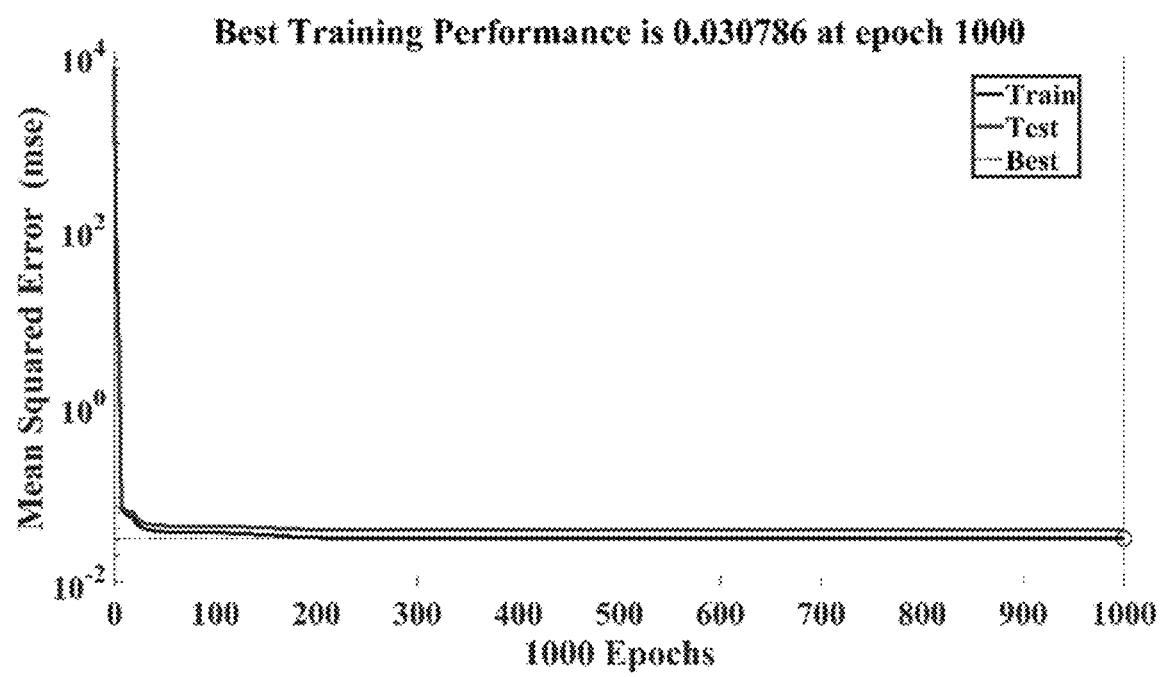
FIG. 5A shows a diagram of a root mean square error in fitting performance evaluation indexes of a neural network for predicting the junction temperature of an SiC chip provided by an embodiment of the present disclosure.
Figure 5B:
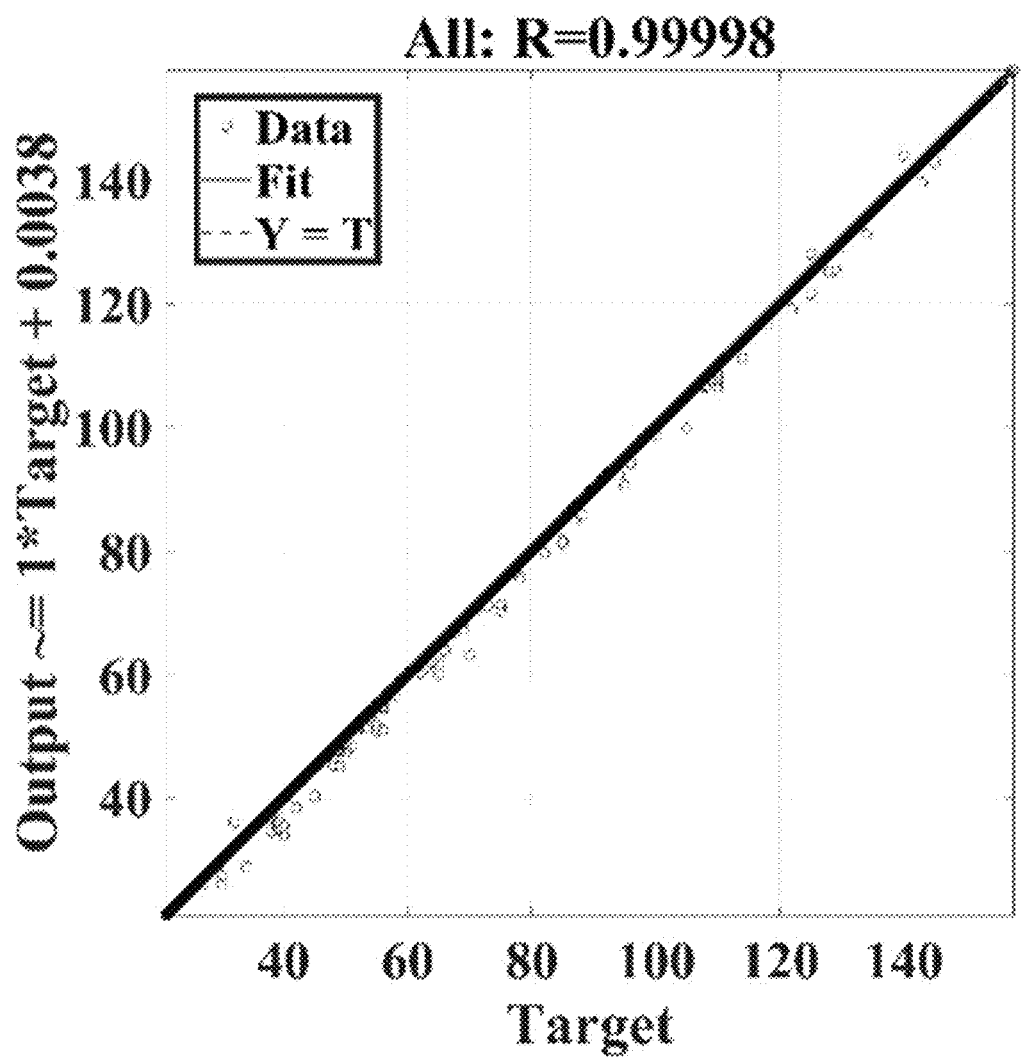
FIG. 5B shows a diagram of regression analysis in fitting performance evaluation indexes of a neural network for predicting the junction temperature of an SiC chip provided by an embodiment of the present disclosure.

The selected neural network is a BP neural network. After testing, the BP neural network with a hidden layer has relatively high fitting accuracy. In order to reduce the subsequent hardware burden the BP neural network structure with a hidden layer is selected, and the number of neurons in the hidden layer is 10. On the basis of determining the structure of the neural network, the genetic algorithm (GA) is used for optimizing the weight and threshold of the BP neural network to obtain the neural network with the minimum prediction error. The flow chart of optimization is shown in FIG. 4. During optimization, the 5000 sets of data obtained is divided into a training set (accounting for 70%), a testing set (accounting for 15%), and a verification set (accounting for 15%) to train the neural network model, and the training effect is evaluated, FIGS. 5A-5B are effect diagrams of fitting performance evaluation indexes of the optimal neural network for predicting the junction temperature of SiC chips obtained after optimization is completed. As shown in FIG. 5A, the root mean square error of the neural network subjected to 1000 iterations of training is close to zero, which indicates that the training effect of the neural network is excellent. At the same time, as shown in FIG. 5B, the regression coefficient R is 0.99998, which indicates that there is a significant linear regression relationship between the output of the neural network and the target. The root mean square error and the regression coefficient result show that the trained neural network model can accurately reflect the relationship among the temperature of the NTC thermistor network, the water flow rate, the aging degree and the junction temperature of the SiC chip, and the high-precision junction temperature prediction in the full life cycle under all working conditions is realized.

It should be noted that the embodiments of the present disclosure can be realized by hardware, software, or a combination of software and hardware. The hardware part can be realized by special logic; and the software part can be stored in a memory and executed by a suitable instruction execution system, such as a microprocessor or specially designed hardware.

The above is only the specific implementation manner of the present disclosure, but the scope of protection of the present disclosure is not limited thereto. Any person skilled in the art can easily think of changes or replacements within the technical scope disclosed by the present disclosure, which should be covered by the scope of protection of the present disclosure.

What is claimed is:

1. A method for predicting a junction temperature of a power semiconductor module in the full life cycle, comprising:

arranging an NTC thermistor network to monitor the temperature of each area inside the power module when the power module works; obtaining data for training the neural network by utilizing finite element simulation or experiments, and building a neural network model among the temperature of the NTC thermistor network, a cooling water flow rate, an aging factor and the junction temperature of a chip of the power module under working various conditions of a high/low switching frequency, a high/low junction temperature, a high/low water flow rate and an aging degree; dividing a data set according to the proportion of 70% of training set, 15% of testing set and 15% of verification set, and training the neural network model according to input and output data; transplanting the trained neural network model to a controller of power electronic equipment, and calibrating the neural network model online; predicting the junction temperature of the chip of the aged power module by using the updated neural network model, evaluating SOH (state-of-health) of the module online, and early warning the potential failure in the later life cycle;

wherein the method for predicting the junction temperature of a power semiconductor module in the full life cycle comprises the following steps:

step one, arranging the NTC thermistor network to monitor the temperature of each area inside the power module when the power module works;

step two, building the neural network model among parameters of the NTC thermistor network under various working conditions; obtaining input and output data of the neural network, step three, training the neural network model according to the obtained input and output data; and step four, deploying the neural network model to realize the on-line detection of the junction temperature of the chip;

wherein the arranging the NTC thermistor network in step one comprises that the number of NTC thermistors arranged is equivalent to the number of chips inside the power module; the NTC thermistors are placed at positions that facilitate processing and manufacturing; a high temperature area of the power module is located near MOSFETs or IGBTs, a middle temperature area is located near diodes, and a low temperature area is located far from the chips in the power module; the number of the NTC thermistors arranged in the high temperature area is close to that of the MOSFETs or IGBTs, the number of the NTC thermistors in the middle temperature area is half that of the diodes, and the number of the NTC thermistors in the low temperature area is 2-4; the number and location of the chips placed in each area are optimized according to simulation results; and according to the layout scheme of temperature sensors, the temperature of each area inside the power module is monitored when the power module works;

wherein the building the neural network model in step two comprises that when the data for training the neural network is obtained by utilizing finite element simulation or experiments, various working conditions are simulated, multiple sets of data are collected, and the neural network model among the temperature of the NTC thermistor network, the cooling water flow rate, the aging factor and the junction temperature of the chip is built under working conditions of the high/low switching frequency, the high/low junction temperature, the high/low water flow rate and the aging degree; in the simulation or experiments, multiple sets of steady-state junction temperature data of each chip and temperature data of each thermistor under various working conditions are obtained in total by greatly changing the heating power P of the chip, the cooling water flow rate h of the power module and the aging factor F describing the aging degree; in the simulation, the aging degree is changed by reducing the thermal conductivity of each layer of packaging materials of the power module; and in the experiments, the aging degree is changed by accelerating aging through power cycle or temperature cycle experiments;

in temperature data, the temperature of part of NTC thermistors which are closely and thermally coupled with the chips and the cooling water flow rate h is selected as the input of the neural network, the temperature of the remaining NTC thermistors in the high, middle and low temperature areas is selected as a calibration output of the neural network, and the junction temperature of all the chips is selected as the target output of the neural network; the aging factor F reflecting the aging degree is taken as the input of the neural network, so that the neural network model can be updated adaptively according to the aging condition of the power module; when the power module is aged, the neural network is updated by changing the input F value, and the F value is determined by the temperature of the NTC thermistors as the calibration output of the neural network; when the power module is not aged, the F value is 0; when the power module is aged, the F value is determined by the following formula:

$F_{Ri}=k_i(T_{Ri(actual)}-T_{Ri(predict)})/T_{Ri(actual)}-T_{amb})$;

where $k_i$ represents a proportional coefficient, $T_{Ri(actual)}$ represents the measured temperature of the NTC thermistor labeled i, $T_{Ri(predict)}$ represents the output temperature of the corresponding NTC thermistor predicated by the neutral network when the F value of the NTC thermistor labeled i is 0 and the power module is not aged, and $T_{amb}$ represents an environment temperature; and a power module temperature measuring platform is built by combining applications and actual working conditions, and the temperature data is measured by using an optical fiber or a thermal imager, so that multiple sets of training data under actual working conditions are obtained; and by weighing the prediction accuracy of the junction temperature of the chip and a number of the NTC thermistors, the number of inputs and outputs of the neural network is adjusted according to application requirements;

wherein the training the neural network model in step three comprises that when the neural network model is trained according to the obtained input and output data, the number of layers of the selected neural network and a number of neurons in a hidden layer are obtained by manual debugging or by optimization through a genetic algorithm in optimization algorithms, and the neural network model with the best fitting effect is selected; the training of the neural network is completed in computer software MATLAB or Python; and before training, the data set is divided according to the proportion of 70% of training set, 15% of testing set and 15% of verification set;

wherein the deploying the neural network model in step four comprises that the trained neural network model is transplanted to a controller such as a FPGA of power electronic equipment to realize the online detection of the junction temperature of the chip; when the power module works, the controller predicts the output of the neural network as the junction temperature of multiple chips and calibrates the temperature of the NTC thermistor network by collecting the cooling water flow rate h, the temperature T of the thermistor as the input of the neural network and the aging factor F reflecting the aging condition in real time; by comparing the predicted temperature value and the measured temperature value of the neutral network for calibrating the NTC thermistor network, whether the module has an accelerating phenomenon is checked online, wherein F is set to 0; if the corresponding F value calculated according to the difference between the predicted temperature value and the measured temperature value of the neural network changes greatly, the input F value is updated; the updating threshold of the aging factor F is set; when the difference between the latest calculated F value and the F value during calibration exceeds the set threshold, the online updating process of the neural network is started; the threshold setting is related to the proportional coefficient k, and the appropriate k value is selected; and if it is difficult to obtain data related to the aging degree during obtaining data, a network weight of the neural network is updated during updating the neural network, and meanwhile the aging factor as the input is set to 0; and when the difference between the measured temperature of the NTC thermistor network as the calibration output and the predicted temperature of the neural network model exceeds 3° C. for three consecutive times, the online weight updating process of the neural network is started, wherein the training data of the online weight updating process comes from historical cooling condition data of the power module, temperature measurement data of the NTC thermistor network and junction temperature prediction data stored by the controller before the updating starts; according to the training data of the online weight updating process, the neural network is retrained in the FPGA, and the weight value w of the neural network is updated, thereby realizing the online calibration of the neural network model; and the updated neural network is used for predicting the junction temperature of the multiple chips in the aging power module, evaluating the SOH state of the module online, and warning the potential failure in the later life cycle.

2. A computer device, comprising a memory and a processor, wherein the memory stores a computer program, and when the computer program is executed by the processor, the processor executes the steps of the method for predicting the junction temperature of a power semiconductor module in the full life cycle according to claim 1.

3. A computer readable storage medium, storing a computer program, wherein when the computer program is executed by the processor, the processor executes the steps of the method for predicting the junction temperature of a power semiconductor module in the full life cycle according to claim 1.

4. An information data processing terminal, being configured to realize the system for predicting the junction temperature of a power semiconductor module according to claim 1.

5. A system for predicting a junction temperature of a power semiconductor module in the full life cycle using the method for predicting a junction temperature of a power semiconductor module in the full life cycle according to claim 1, comprising:
- an NTC thermistor network arrangement module, configured to arrange the NTC thermistor network to monitor the temperature of each area inside the power module when the power module works;
- a neutral network model building module, configured to build the neural network model among the temperature of the NTC thermistor network, the cooling water flow rate, the aging factor, and the junction temperature of the chip under various working conditions;
- a neutral network model training module, configured to divide the training set, the testing set, and the verification set in proportion, and training the neural network model according to the obtained input and output data; and
- a neutral network model deployment module, configured to deploy the neural network model, detect the junction temperature of the chip online, evaluate the SOH state of the module, and warn the potential failure in the later life cycle.

* * * * *